US009636886B2

(12) United States Patent
Karle et al.

(10) Patent No.: US 9,636,886 B2
(45) Date of Patent: May 2, 2017

(54) PREFABRICATED CONCRETE ELEMENT HAVING TEXTILE REINFORCEMENT AND RETAINERS

(71) Applicant: Groz-Beckert KG, Albstadt (DE)

(72) Inventors: Roland Karle, Bisingen (DE); Johann Pfaff, Winterlingen (DE); Hans Kromer, Winterlingen (DE)

(73) Assignee: GROZ-BECKERT KG, Albstadt (DE)

( * ) Notice: Subject to any disclaimer, the term of this patent is extended or adjusted under 35 U.S.C. 154(b) by 0 days.

(21) Appl. No.: 14/759,135

(22) PCT Filed: Jan. 2, 2014

(86) PCT No.: PCT/EP2014/050003
§ 371 (c)(1),
(2) Date: Jul. 2, 2015

(87) PCT Pub. No.: WO2014/106625
PCT Pub. Date: Jul. 10, 2014

(65) Prior Publication Data
US 2015/0345140 A1 Dec. 3, 2015

(30) Foreign Application Priority Data
Jan. 4, 2013 (DE) .................... 10 2013 100 053

(51) Int. Cl.
*B32B 13/00* (2006.01)
*B32B 3/06* (2006.01)
(Continued)

(52) U.S. Cl.
CPC ............... *B32B 3/06* (2013.01); *B29C 39/10* (2013.01); *B32B 3/08* (2013.01); *B32B 5/26* (2013.01);
(Continued)

(58) Field of Classification Search
CPC ....... E04C 2/06; E04C 5/01; E04C 5/07; E04B 2103/02; B32B 5/26; B32B 2260/044; B32B 2260/023; B29C 39/10
(Continued)

(56) References Cited

U.S. PATENT DOCUMENTS 3,903,668 A 9/1975 Megumi
4,085,556 A 4/1978 Sonneville
(Continued)

FOREIGN PATENT DOCUMENTS

DE 1759606 A1 6/1971
DE 128693 A5 12/1977
(Continued)

OTHER PUBLICATIONS

International Search Report of corresponding International Application No. PCT/EP2014/050003, dated Jun. 2, 2014, 3 pages.

*Primary Examiner* — Brian Mattei
*Assistant Examiner* — Gisele Ford
(74) *Attorney, Agent, or Firm* — Fitch, Even, Tabin & Flannery LLP

(57) ABSTRACT

A prefabricated concrete element (10) having a textile reinforcement (17) comprising fastening elements (12, 13, 14, 15), which are connected directly to the reinforcement (17). The fastening elements (12 to 15) can have a bent form and pass through a flat side of the prefabricated concrete element (10). The fastening elements can also have a straight or elongated form and emerge on narrow sides of a plate-shaped prefabricated concrete element (I 0). Because of the direct connection between the fastening element (12 to 15) and the reinforcement (17), the prefabricated concrete element can have an especially extensive and thin form and thus can be used as a façade panel.

18 Claims, 8 Drawing Sheets

(51) Int. Cl.
*E04C 2/06* (2006.01)
*E04C 5/01* (2006.01)
*E04C 5/07* (2006.01)
*B29C 39/10* (2006.01)
*B32B 5/26* (2006.01)
*B32B 3/08* (2006.01)
*E04F 13/14* (2006.01)
*E04C 2/00* (2006.01)

(52) U.S. Cl.
CPC .................. *E04C 2/06* (2013.01); *E04C 5/01* (2013.01); *E04C 5/07* (2013.01); *E04F 13/141* (2013.01); *E04F 13/148* (2013.01); *B32B 2260/023* (2013.01); *B32B 2260/044* (2013.01); *B32B 2419/00* (2013.01); *E04B 2103/02* (2013.01); *E04C 2002/002* (2013.01)

(58) Field of Classification Search
USPC ........ 52/124.2, 125.2, 15.3, 125.5, 415, 418
See application file for complete search history.

(56) References Cited

U.S. PATENT DOCUMENTS

| | | | | |
|---|---|---|---|---|
| 4,910,076 A * | 3/1990 | Ando | ...................... | C04B 20/12 442/20 |
| 5,552,207 A * | 9/1996 | Porter | ...................... | D03D 9/00 428/109 |
| 5,836,715 A * | 11/1998 | Hendrix | ................ | B29B 15/125 404/134 |
| 6,263,629 B1 * | 7/2001 | Brown, Jr. | .............. | E04C 2/044 442/179 |
| 7,445,738 B2 * | 11/2008 | Dubey | .................... | B28B 1/522 156/42 |
| 8,312,827 B1 * | 11/2012 | Free | .......................... | B32B 5/06 112/475.08 |
| 2002/0182953 A1 * | 12/2002 | Porter | ...................... | B32B 5/26 442/4 |
| 2005/0009428 A1 * | 1/2005 | Porter | ...................... | B32B 5/02 442/129 |
| 2006/0225376 A1 * | 10/2006 | Foldager | ................... | E04C 5/04 52/450 |
| 2010/0009116 A1 * | 1/2010 | Takeda | .................... | B29C 70/16 428/114 |
| 2010/0269881 A1 * | 10/2010 | Scheller | ..................... | B32B 5/26 136/242 |
| 2012/0148806 A1 * | 6/2012 | Dubey | ................ | B28B 19/0092 428/193 |
| 2012/0204499 A1 * | 8/2012 | Brandstrom | ............... | E04C 5/07 52/125.4 |
| 2013/0195541 A1 * | 8/2013 | Pantelides | ................. | F16B 9/02 403/188 |

FOREIGN PATENT DOCUMENTS

| | | |
|---|---|---|
| DE | 3608953 A1 | 9/1987 |
| DE | 10260684 A1 | 7/2004 |
| EP | 0113290 A1 | 7/1984 |
| FR | 317753 A | 9/1902 |
| FR | 342879 A | 9/1904 |
| FR | 2207233 A1 | 6/1974 |
| FR | 2627213 A1 | 8/1989 |

* cited by examiner

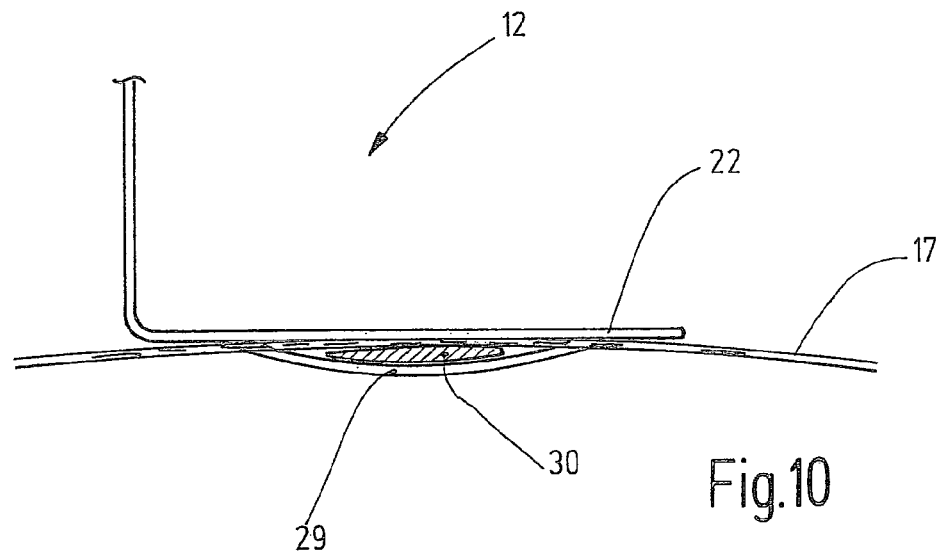
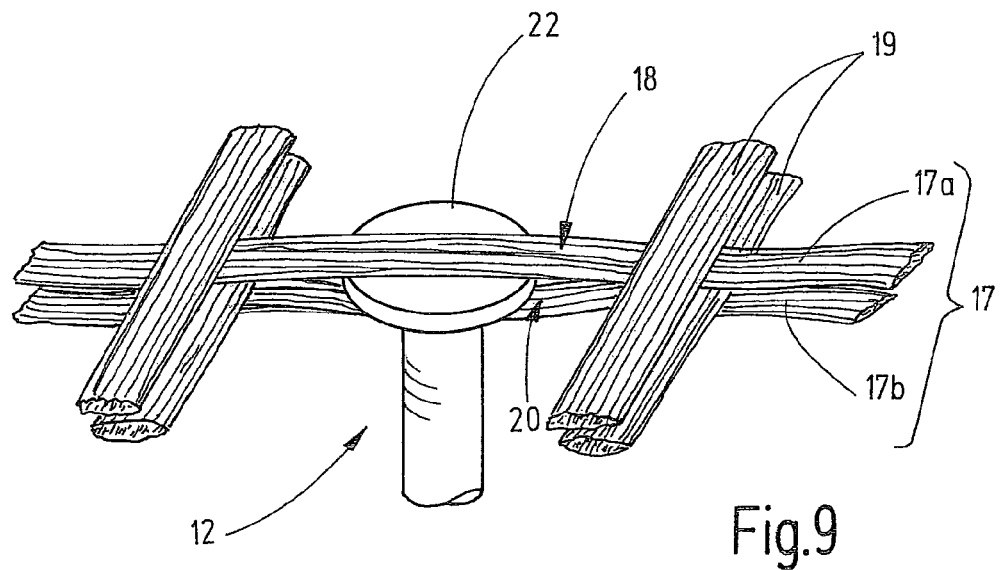

PREFABRICATED CONCRETE ELEMENT HAVING TEXTILE REINFORCEMENT AND RETAINERS

CROSS REFERENCE TO RELATED APPLICATIONS

This patent application is the national phase of PCT/EP2014/050003 filed Jan. 2, 2014, which claims the benefit of German Patent Application No. 10 2013 100 053.3 filed Jan. 4, 2013.

TECHNICAL FIELD

The invention relates to prefabricated concrete element, in particular for facade panels, as well as to a process for manufacturing a prefabricated concrete element.

BACKGROUND

Prefabricated concrete elements comprise a concrete body into which is embedded a linear, planar or spatial reinforcement of rods, mats or baskets. It has been known to provide holders for fastening purposes and/or transport purposes, said holders projecting from the concrete body or being an integral part thereof and being connected to the reinforcement.

For example, publication DD 128693 discloses concrete elements with a reinforcement of steel brackets, wherein the steel brackets are connected to additional steel profiles that form the anchoring points for fastening bolts. Such fastening bolts are inserted through openings into the prefabricated concrete part and hooked together with the steel elements.

Furthermore, publication DE 36 08 953 discloses facade panels with a reinforcement that encloses a steel rod for concrete. This steel rod for concrete extends through a cutout of the facade panel and can thus act as a fastening point.

Publication DE 102 60 684 A1 relates to thin facade elements and their fastening to a carrier system in front of the thermal damming of a house wall. The plate-shaped facade elements consist of concrete and comprise a reinforcement inlay of a glass fiber fabric or of glass fiber layers. Holding elements are laminated into the facade element. The holding elements are threaded sleeves having an anchoring disk that is laminated into the facade element. Alternatively, holding elements of a flat material of metal have been suggested. The metal is angled in such a manner that there are two tabs facing away from each other. They are laminated into the facade element.

Frequently, facade elements are to be made as thin as possible in order to reduce the weight of the facade and to facilitate mounting. On the other hand, frequently facade panels are to be provided in large dimensions as rectangular plates, wherein one edge length of up to 2 meters or greater is required. As concerns the suspension elements of facade panels, this means that, despite the low panel thickness, there are considerable additional weight stresses to be absorbed, in which case—due to the panel size—there are additional wind stresses that must be transmitted to the mounting system—without damaging or fatiguing the panels. Due to the attempted low thickness of the panels this can prove to be difficult.

SUMMARY

It is one object of the invention to provide a prefabricated concrete element that solves at least one of the aforementioned technical problems. Furthermore, it is one object of the invention to provide a practical method for manufacturing a prefabricated concrete element.

The prefabricated concrete element according to the invention comprises a base body of concrete, said body being provided with at least one layer of a textile reinforcement. This concrete is a material wherein particles of different sizes are held together by a binding material. For example, the particles may be mineral particles that are held together by neat cement paste (so-called wet-mix aggregate). Instead of the neat cement paste, it is also possible to use an organic binding material such as, for example, a synthetic resin (so-called polymer concrete). The bound particles may be sand, rock flour, glass or the like. Furthermore, the bound particles may also be of a non-mineral nature and comprise, for example, wood flour or other materials (wood concrete, fiber cement and the like).

The concrete forms a base body in which is embedded at least one layer of a textile reinforcement. The textile reinforcement consists of a fiber material, preferably with ordered fiber orientations. Preferably, the fibers are combined in filaments, strands, rovings or the like. The fiber material may be natural fibers, synthetic fibers, mineral fibers, glass fibers, carbon fibers and/or metal fibers, or a mixture of one or more of the said materials.

Preferably, the reinforcement material is a layer structure, a woven, a net or also a knit material. The fabric, layer structure or net may form a grid-like structure. Also other textile structures, wherein fibers, filaments or rovings are ordered in at least two different orientations can be used. In particular at intersecting points, the fibers, filaments or rovings of the layer structure or other arrangements can be cemented together, stitched together with binding threads or be bonded or welded together.

In accordance with the invention, one or more fastening elements are provided that are material-bonded directly to the textile reinforcement material or clamped together. Consequently, independent of the embedding of the fastening elements in the concrete, there exists a material-bonded connection between the fastening element and the reinforcement.

Preferably, the connection between the reinforcement material and the fastening element is material-bonded. However, it is also possible to use other connecting techniques that result in a direct connection between the fastening element and the textile reinforcement such as, for example, positive connections or clamping connections. This can also be accomplished by a clamping connection, wherein the fastening element comprises a clamping device for clamping the reinforcement in place.

This material-bonded connection is facilitated by a connecting material that is different from the bonding agent of the concrete. This bonding material may be an adhesive, in particular an organic adhesive. The organic adhesive can be introduced between a section of the fastening element and the reinforcement and cure in a suitable manner. They may be adhesives that cure due to the evaporation of solvents. They may also be adhesives that cure by chemical reaction, in particular cross-linking. Furthermore, they can be hot-melt adhesives that cure by cooling. If the textile reinforcement is provided with a plastic coating to produce the material-bonded connection, this plastic coating may also act to produce the material-bonded connection to the fastening elements. For example, it is possible to provide a plastic coating that can be thermally melt-deposited like a hot-melt adhesive and can thus be bound to the fastening element. Alternatively, an organic adhesive may be selected which, on the one had, creates a good connection to the plastic coating and, on the other hand, a good connection to the fastening element.

Particularly suitable adhesives are epoxide resins, polyurethanes or the like. The adhesive connection may consist of an adhesive film that is applied to the fastening element.

In the case of a clamping connection, the reinforcement can be placed in the form of a mat between two or more legs of the fastening element and be clamped in place due to the plastic deformation of the legs or by the insertion of a clamping pin.

By applying the concept in accordance with the invention, prefabricated concrete elements in the form of thin plates, wherein the viewed surface, i.e., the flat surface, is free of cutouts and visible imprints, can be manufactured. Also, for later fastening such panels to a carrier system, neither cutouts nor visible fastening elements need be provided.

The fastening element may consist of metal or also of a plastic material, in particular a plastic composite material. The plastic composite material may comprise a plastic matrix in which fiber materials are embedded. The composite material may be adapted to the prefabricated concrete element in view of its thermal expansion. It may be an injection-molded part or a extruded part. It, in turn, may be reinforced with glass fibers or carbon fibers. Preferably, short fibers may be used here. Furthermore, the fastening element can be configured so as to be adjustable lengthwise and/or crosswise. If the fastening element consists of plastic material, it is possible, for example, to connect it, for example, by means of suitable welding techniques, for example ultrasonic welding, to the reinforcement material, in particular its plastic coating. Other welding processes or the use of an additional adhesive are also possible.

If the fastening element consists of metal, it is possible to use, in particular hot-melt adhesive for connection, in which case said adhesive is applied to a pre-heated section of the fastening element, for example. The thusly prepared fastening element can then be pressed onto a reinforcement layer and cooled, thus creating the connection.

Preferably, a planar connection, i.e., not only a glued seam but a glued area, is formed between the fastening element and the reinforcement. With the application of the known concept, it is possible to achieve a large-area force transmission between the fastening element and the reinforcement. The force flow from the reinforcement to the fastening element thus does not go or goes only to minimal parts of the base body, thus making it possible to achieve good durability and high stress-resistance also with thin-walled prefabricated concrete parts.

This is true, in particular, if the fastening element has a planar anchoring section configured, for example, as a flat panel that extends behind the reinforcement in a planar manner or that is inserted in a pocket of the reinforcement. The pocket may be formed on a reinforcement or between two reinforcement layers. For example, it may be formed by the intermediate space existing between two reinforcement layers. The pocket may be accessible through slit provided in one of the reinforcement layers or through the meshes of one of the reinforcement layers. A pocket may also be formed only in the region of the fastening element in that the reinforcement is connected there to another textile having the same or a different structural design. Then the pocket is formed between the reinforcement and the additional textile. The relevant descriptions hereinabove also apply regarding the accessibility of the pocket.

The fastening element can extend through a slit formed in the reinforcement and its plate may extend behind the fastening element. A slit is a line-shaped or strip-shaped region, in which strands of the reinforcement extending in one direction are interrupted, while strands of the reinforcement extending transversely thereto are not severed.

The fastening element may also extend through gaps of the grid formed by the strands of the reinforcement. This applies, in particular, to reinforcement grids having a mesh width that is greater than the width of the panel. If the mesh width is smaller than the width of a panel, the panel may also be provided with one or more slits in order to engage in several adjacent meshes.

It is pointed out that the term "mesh" and terms derived therefrom such as "mesh width", "grid mesh" or the like relate to interstices of the fabrics, layer structures, nets, grid arrangements or other planar textile structures. It is not restricted to knitted or interlaced materials.

The prefabricated concrete element can be manufactured efficiently. In particular, it has been found that the arrangement of the fastening elements on the reinforcement and the connection of the fastening elements to the reinforcement elements before the concrete part is cast imply a great facilitation of the work and a gain in view of the achievable precision. The cutting of the reinforcement and the arrangement of the fastening elements thereon, as well as creating the connection can be performed by machine. Accordingly, the fastening elements that are connected to the reinforcement—after the concrete body has been formed—can be used for removal of the concrete body from its form even if the base body consisting of concrete has not yet fully cured but only displays sufficient initial strength.

The reinforcement is a planar textile structure comprising at least one layer (reinforcement layer). This structure may comprise several layers of equally or differently configured reinforcement structures that are loosely placed on each other, connected to each other only by the concrete body or forming, among each other, reinforcement layers that are also connected to each other, independently of the concrete body.

After casting it together with the concrete, the fastening element can be cut off so that it acts only as a spacer during the casting process. Alternatively, different fastening elements may be fastened to the reinforcement, in which case some are cut off and others remain for installation.

Details of advantageous embodiments of the invention can be inferred from the claims, the description or the drawings. They show in

BRIEF DESCRIPTION OF THE DRAWINGS

FIG. 9 a further modified embodiment of a prefabricated concrete element, in a perspective view of a section of its reinforcement;

FIG. 10 a modified embodiment of a prefabricated concrete element with a clamping fastening of the reinforcement, in a cross-sectional representation of a section as in FIG. 2;

DETAILED DESCRIPTION

Figure 1:
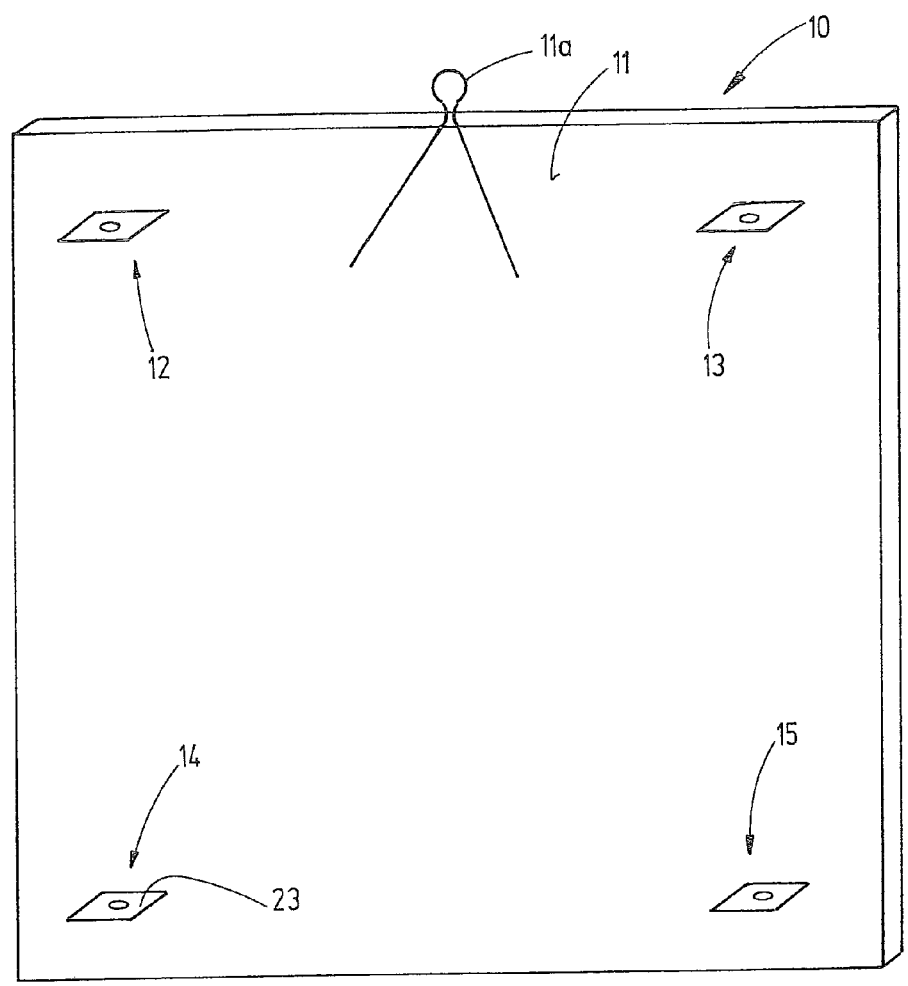
FIG. 1 a perspective simplified total view of a prefabricated concrete element.

FIG. 1 shows a prefabricated concrete element 10 that is configured as a flat thin plate. In doing so, FIG. 1 shows the fastening side as used on a facade facing away from the viewer, in which case several fastening elements 12, 23, 14, 15 project from the rear flat side 11. All of these fastening elements are preferably configured in the same manner so that the description of the fastening element 12 hereinafter is also representative of all the others. In addition to the fastening elements 12, 13, 14, 15, a transport lug 11a may be glued to the rear side of the panel, which transport lug can be cut off following, e.g., the installation of the prefabricated concrete element 10. The transport lug 11a may be made of plastic material, a rope of plastic material or of metal.

Figure 2:
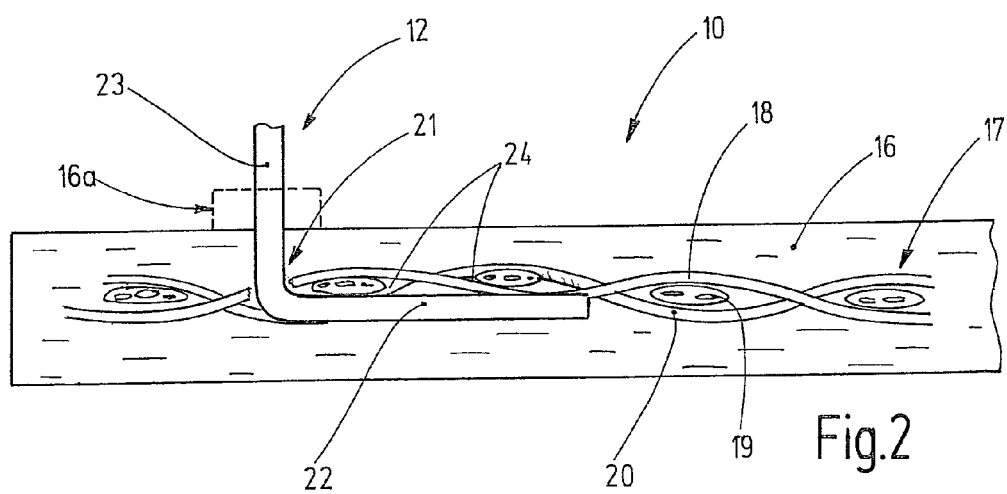
FIG. 2 a cross-sectional representation of a section of the prefabricated concrete element as in FIG. 1, in a schematic representation.

In accordance with FIG. 2, the prefabricated concrete element 10 comprises a base body 16 that consists of a concrete. This may be mineral concrete, polymer concrete, textile concrete or the like. Preferably, it is mineral concrete consisting of mineral additives and cement paste. A reinforcement 17 is embedded in this base body 16. Preferably, this reinforcement is arranged in the center. It consists of filaments or strands 18, 19, 20 or rovings of a fiber material such as, for example, glass fibers, synthetic fibers, carbon fibers or the like, that are made into an essentially planar woven fabric or layer structure. Considering this, as well as all the other subsequently explained exemplary embodiments, it applies that the filaments or strands 18, 19, 20 or rovings of the fiber material of the reinforcement 17 may be impregnated, for example with an epoxide resin. As a substitute or in addition, it is also possible to apply an adhesive, e.g. a hot-melt adhesive. At the intersecting points, this can connect the strands 18, 19, 20 to each other, so that the reinforcement 17 forms a relatively stiff and thus easy to handle grid.

FIG. 2 shows a woven fabric wherein the fiber strands 18, 20 form warp threads and the fiber strands 19 form weft threads. The woven fabric forms a grid structure as is obvious, in particular, from FIG. 6. Instead of the grid-like fabric structure it is also possible, however, to use a layer structure with threads or rovings intersecting at a right angle, for example, an interlaced material or a knit material. In the case of a roving, the threads or rovings arranged in the grid structure can be arranged on two or more planes and be connected at the intersecting points by being glued or welded together.

The base body 16 may be configured as a flat plate. Optionally said plate may have a collar 16a formed on it near the fastening element 12, as shown in dashed lines in FIG. 2.

In the exemplary embodiment according to FIG. 2 (and FIG. 6) the reinforcement 17 has a slit 21 through which extends the reinforcement element 12. It has an anchoring section 22 which, here, is configured as a plate-shaped foot arranged parallel to the reinforcement 17. Extending from said foot at a right angle and through the slit 21 is a connecting section 23 that projects from the base body 16 and thus, as shown by FIG. 1, can act to connect the prefabricated concrete element 10 to a support structure, for example.

Considering the exemplary embodiment of the prefabricated concrete element according to FIG. 2, a planar, direct connection exists between the plate-shaped anchoring section 22 and the reinforcement 17 behind which extends said anchoring section. For this purpose, for example a material-bonded connection between a plastic material enveloping the reinforcement 17 and the anchoring section 22 is given. As is indicated in FIG. 2, the strands 18, 19, 20 are soaked in a plastic material, for example, synthetic resin, and coated thereby. By reactivating this plastic material, for example by means of pressure and heat, large-area connecting zones 24 between the anchoring section 22 and the reinforcement 17 are created.

Figure 3:
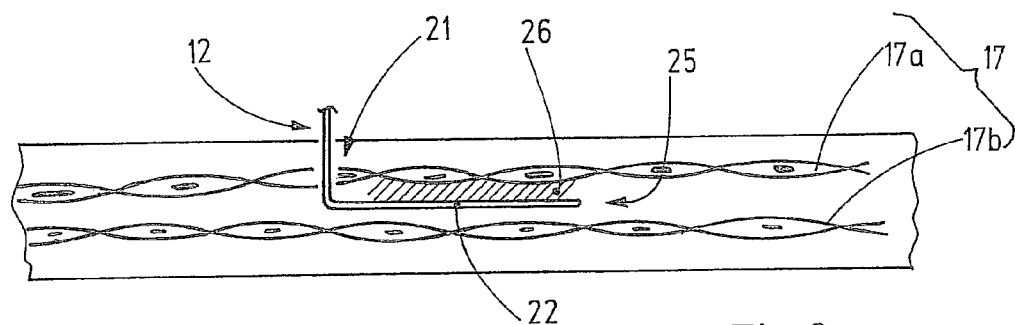
FIG. 3 a cross-sectional representation of a section of a modified embodiment of a prefabricated concrete element as in FIG. 2.

While the reinforcement 17 according to FIG. 2 consists of one layer, it may also have two or more layers according to FIG. 3. An upper reinforcement layer 17a may be provided with the slit 21. A lower reinforcement layer 17b may remain without a slit. In this case, the anchoring section 22 extends in the region of a pocket 25 formed between the two reinforcement layers 17a, 17b. In this manner a positive support of the fastening element 12 on the reinforcement 17 is given. However, in addition to one or both reinforcement layers 17a and/or 17b, a large-area material-bonded connection, for example with the use of adhesive 26, may be provided. Instead of the adhesive 26, it is also possible to reactivate the coating of at least one of the reinforcement layers 17a, 17b, for example by melt-deposition, in order to produce a planar connection to the anchoring section 22.

Figure 4:
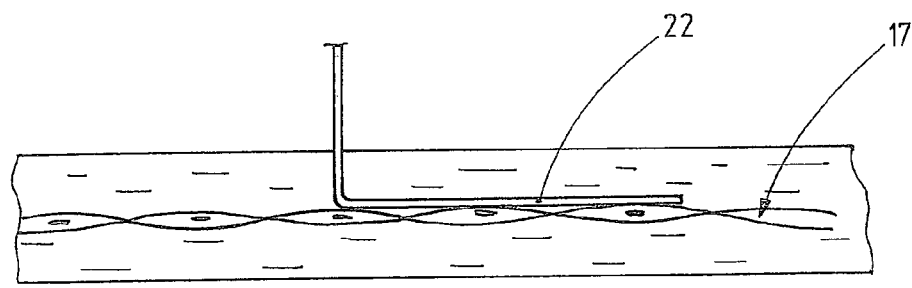
FIG. 4 cross-sectional representation of a section of a modified embodiment of a prefabricated concrete element as in FIG. 2.
Figure 5:
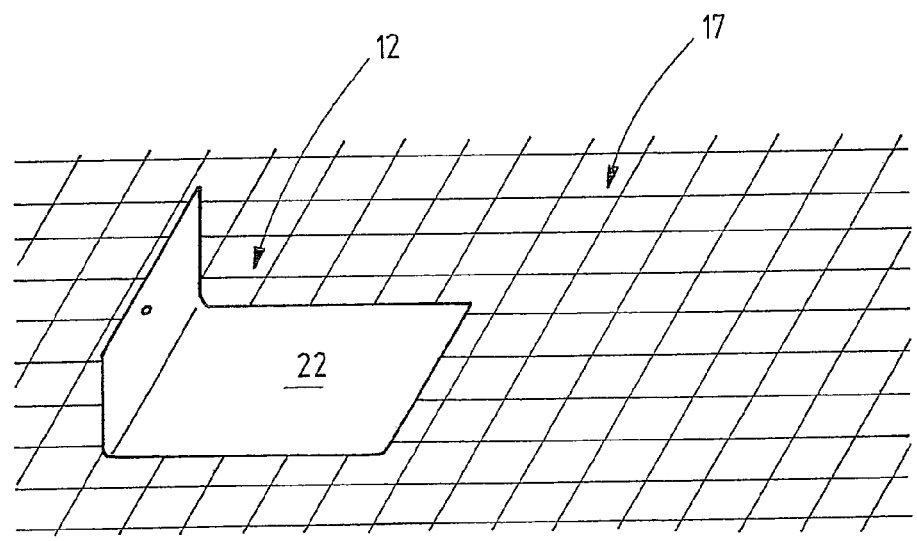
FIG. 5 a perspective representation of a reinforcement with a superimposed fastening element.

As is shown by FIGS. 4 and 5, it is also possible to glue the anchoring section 22 to the reinforcement 17.

Figure 6:
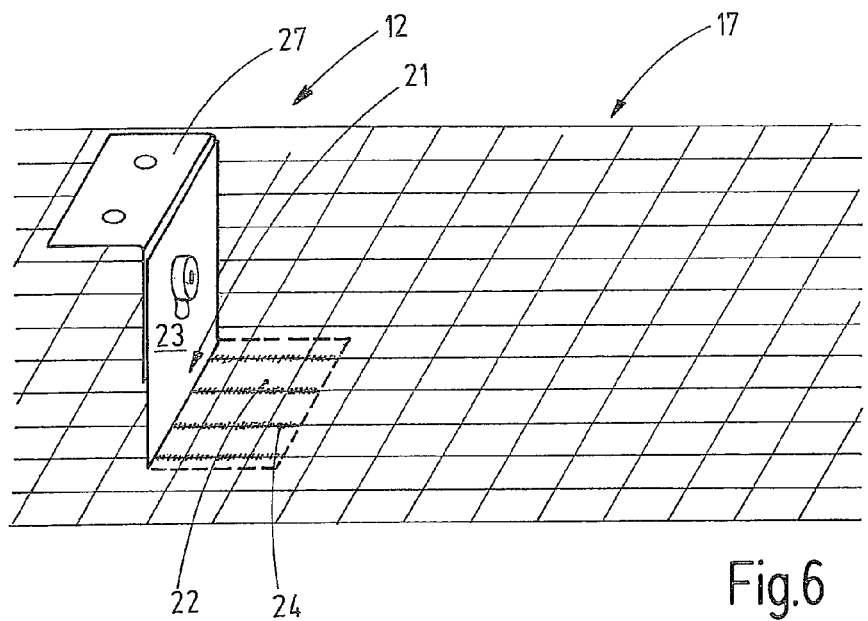
FIG. 6 a perspective representation of a modified embodiment of a reinforcement with a fastening element.

As indicated in FIG. 6, the connecting section 23 can be length-adjustable. To do so, the plate-shaped connecting section may be screwed to another fastening bracket 27. For easier correct positioning of the fastening bracket 27 relative to the connecting section 23, they can be toothed on the sides facing each other and be held together by a fastening screw.

Figure 7:
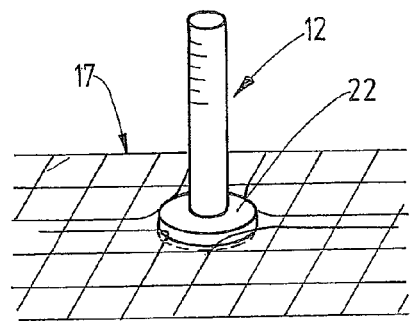
FIG. 7 a perspective representation of a further modified embodiment of a reinforcement and a fastening element.
Figure 8:
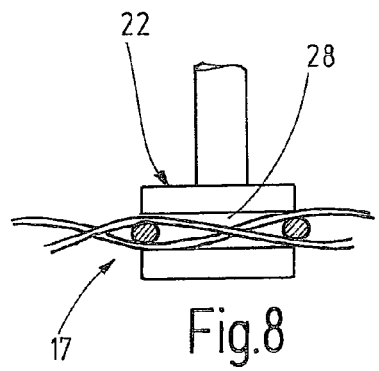
FIG. 8 a side view of a section of the reinforcement and the fastening element as in FIG. 7.

The fastening element 12 may also be different from a bracket configuration, as shown by FIGS. 7 and 8, for example. Then, the fastening element has as its anchoring section 22, for example, a rectangular, cylindrical or otherwise configured head that, for example, is fitted in a fabric loop or another opening of the reinforcement 17. The head 22 may have an outside peripheral groove 28 into which the material of the reinforcement 17 will settle. To accomplish this, the head 22 is connected to the reinforcement 17 with the use of an adhesive.

Embodiments of the reinforcement 17 and of the fastening element 12 that are similar in principal are shown by FIG. 9. The fastening element 12 is configured as a bolt with a flat head as an anchoring section 22. The reinforcement 17 consists of two layers (17a, 17b) of fiber stands that are arranged in a grid pattern, said fiber strands being connected at intersecting points, e.g., by an impregnating paste. The transversely extending strands 19 are part of the two reinforcement layers 17a, 17b. The superimposed longitudinally extending strands 18, 20 also belong to the different reinforcement layers 17a, 17b. While the strand 18 traverses the head 22 diametrically, the strand 20 is widened. Its two partial strands extend below the head (optionally in contact therewith) past both sides of the shaft of the bolt-like fastening element 12. The partial strands accommodate the shaft between them. The fastening element is bound in the reinforcement 17 in a positive manner. Additionally, it may be glued to the reinforcement 17. Also, the shaft may bear a clamping disk that clamps the lower strand 20 in place against the head 22 (not illustrated).

The connection need not necessarily be material-bonded. As shown by FIG. 10, it may also be a clamping connection. Again, in this case, an angle-shaped fastening element 12 is assumed, in which case its plate-shaped anchoring section 22 has a strip-shaped section 29 that is bent out of its plane. The latter extends through a rectangular cutout of the reinforcement 17. A flat or wedge-shaped bar 30 that is driven in between the reinforcement 17 and the section 29 transversely to said section then clamps the reinforcement against the anchoring section 22 in order to clamp the reinforcement 17 in place.

Figure 11:
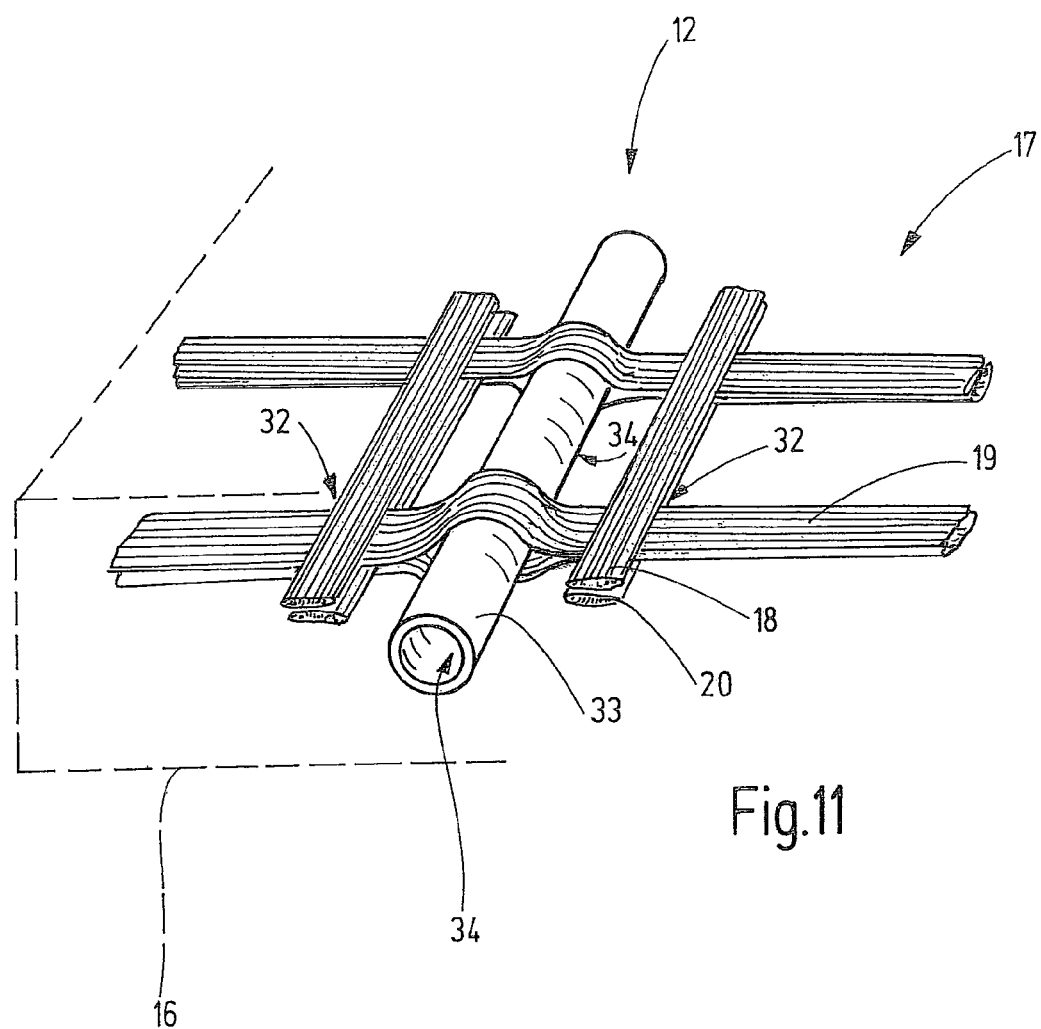
FIG. 11 a modified embodiment of a prefabricated concrete element as a rod element embedded in the reinforcement, in a cross-sectional representation of a section as in FIG. 2.

Numerous additional modifications of the presented embodiments are possible. For example, FIG. 11 shows a one-layer reinforcement 17 that has the form of a layer structure and comprises strands 19 in one direction and strands 18, 20 in another direction. The strands 19 extend through between the strands 18, 20 and are connected to each other at the points of intersection 32, for example, by being glued together, by heat-sealing, welding or by similar techniques. The reinforcement 17 forms a grid-shaped layer structure that, in principle, is also used in all the other embodiments of the invention and, for example, may be used in lieu of woven types of reinforcements 17.

In this case, a rod element 33 is provided as the fastening element 12. It forms an elongated, stretched and thus approximately cylindrical, or also otherwise shaped, elongated body, for example having a circular cross-section or a polygonal cross-section. For example, the rod element 33 may be straight, be bent in a zigzag or meander shape, or have sections as selected otherwise.

In the present exemplary embodiment, the rod element 33 is provided with a thread 34, at least in sections. Instead of this, it is also possible to use one or more annular channels, grooves or the like, or also have zones that are completely or partially knurled, or have a roughened or also smooth peripheral surface.

Preferably, the rod element 33 is configured in such a manner that it terminates on one face side of the base body 16 that is only indicated in dashed lines in FIG. 11. For fastening, the rod element 33 then has, on one face end, a threaded bore 34, i.e., it may be configured as a threaded sleeve. However, it is also possible for the rod element 33 to project, for example, from the narrow side of the base body 16 and to bear other fastening means such as, for example, an outside thread, a lug or the like. Furthermore, the rod element 34 may be angled and project from the flat side of the base body 16 or be flush therewith. Again, all of the aforementioned types of fastening elements are possible.

Figure 12:
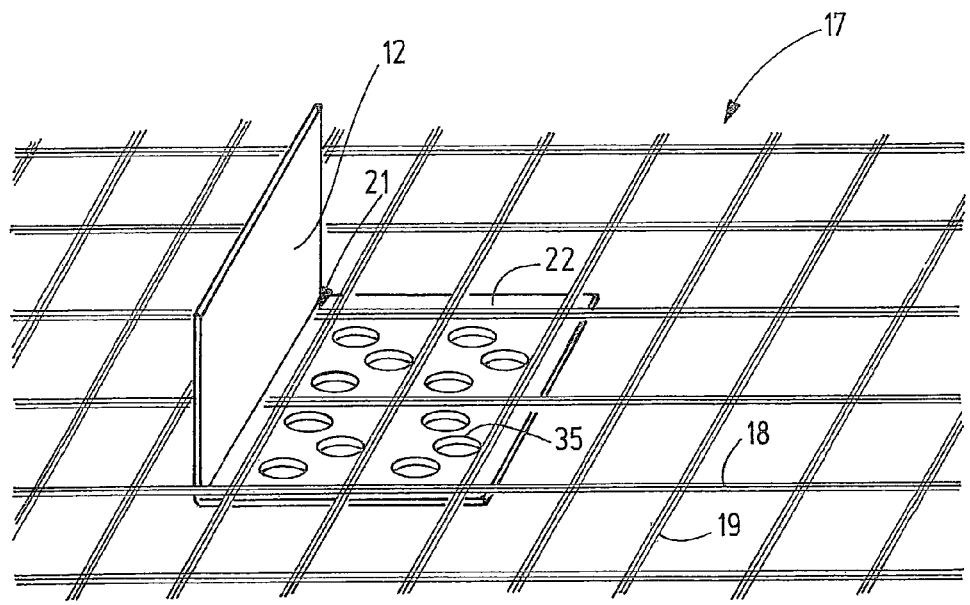
FIG. 12 an embodiment of a prefabricated concrete element with a modified fastening element in adaptation to the embodiment as in FIGS. 1 to 6, in a cross-sectional representation of a section as in FIG. 2.

FIG. 12 shows a modified embodiment of the reinforcement 17 and the fastening element 12 for a prefabricated concrete element 12. The fastening element 12 is configured as a two-leg angled sheet metal part or also as a plastic part, for example. The explanations provided in conjunction with FIGS. 1 to 6 apply analogously. However, the anchoring section 22 may be configured so as to be different from those described hereinabove in that it has one or more cutouts 35. Preferably, these are dimensioned such that they, in the course of the manufacture of the base body 16, can still be filled with a fluid or paste-like material, so that a mechanical connection between the base body 16 and the fastening element 12 is provided.

Due to the cutouts 35, the concrete can flow better while being cast, without losing the adhesive surface when the cutouts 35 of the fastening element 12 are adapted to the grid structure of the reinforcement 17. In addition to punching holes into the fastening element 12, it is also possible to "bend backwards" one or more regions of the anchoring section. In doing so, the pulling forces of the connecting section 22 are introduced in the reinforcement 17 in an adhesion-appropriate manner.

Figure 13:
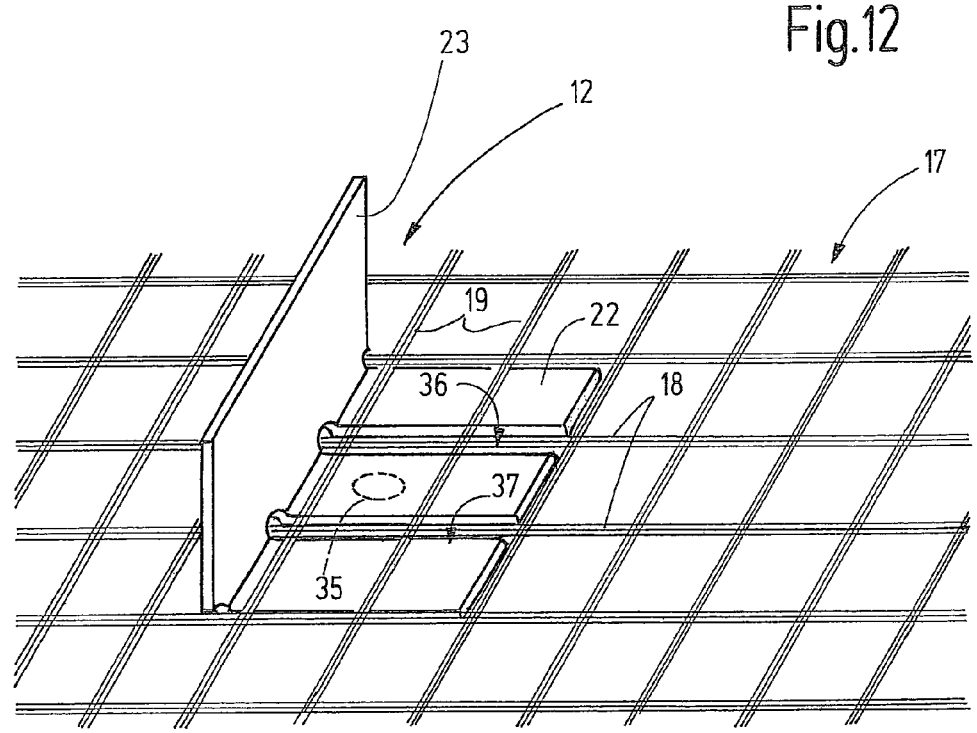
FIG. 13 a modified embodiment of a prefabricated concrete element with clamping fastening of the reinforcement, in a cross-sectional representation of a section as in FIG. 2.

While the fastening element 12 according to FIG. 1 extends through a slit 21 in the reinforcement 17, such a slit may also be omitted according to FIG. 13. In that case, the fastening element 12 is configured according to one of the FIG. 1 to 6 or 12 and has, on its anchoring section 22, additional slits 36, 37 that preferably extend parallel to each other, away from the connecting section 23. The slits 36, 37 extend slightly into the connecting section 23 and are disposed to accommodate the strands 18 of the reinforcement 17. While the strands 18 are located in the slits 36, 37, the strands 19 traverse the anchoring section 22. Consequently, the fastening element 12 comprises an anchoring section 22 that is forked once or several times. The distance of the slits 36 from each other or the distance of the "tines of the fork" from each other is adapted to the distance between the strands 18. In doing so, the fastening element 12 can be hooked to the reinforcement 17. It should be pointed out that, as depicted, the anchoring section 22 may be flat, i.e., plane. However, it is also possible to shape it in a different manner, for example in waves extending transversely to the slits 36, 37. Likewise, said anchoring section may also be provided with additional cutouts 35.

Figure 14:
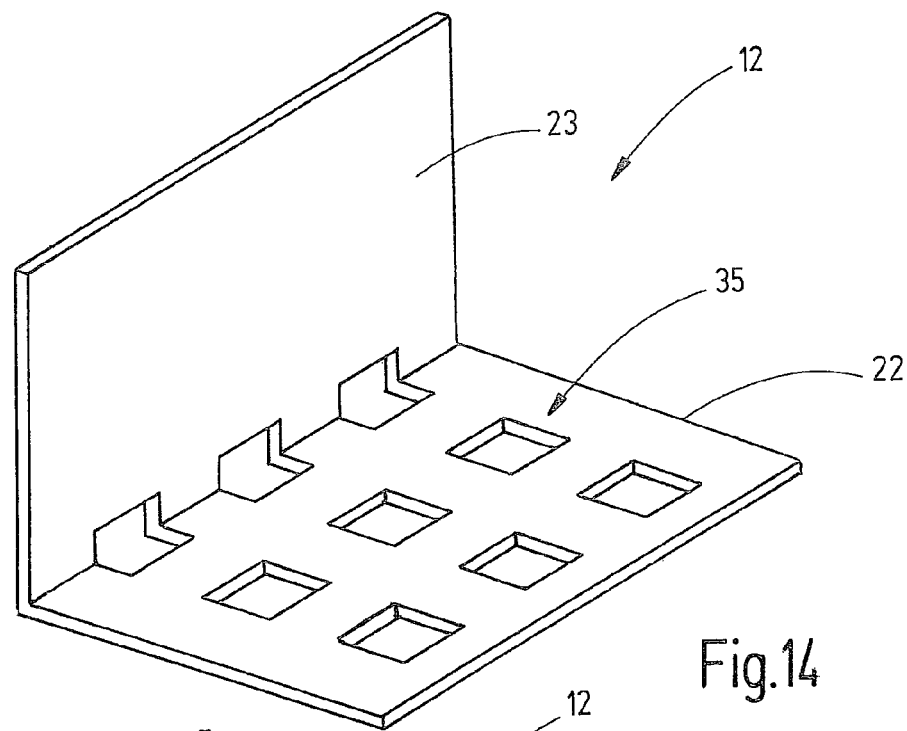
FIG. 14 a perspective isolated view of a modified fastening element with cutouts.

As is shown by FIG. 14 in an exemplary manner, the cutouts 35 in all the embodiments of the fastening elements 12 having at least one plate-shaped section 22 and/or 23 can also be configured as rectangular holes or have another shape.

Figure 15:
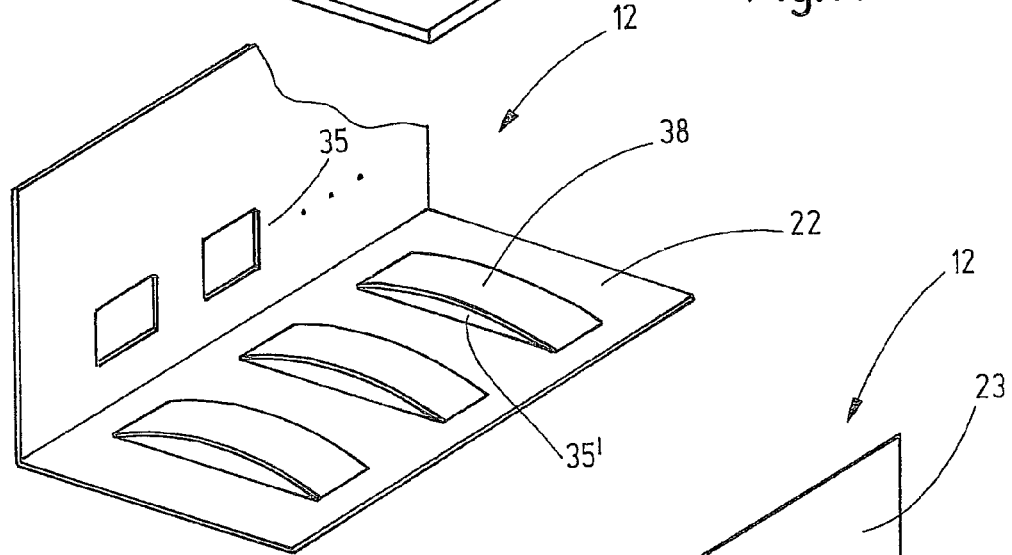
FIG. 15 a perspective isolated view of a modified fastening element having a spatial structure.

As is shown by FIG. 15, the cutouts 35 need by no means be completely patent. It is also possible, to punch out or otherwise free tabs 38 that are still connected to one or both ends of the plate-shaped anchoring section 22. The cutouts 35' may be completely or partially covered by the tabs 38 and be disposed for the accommodation of bars 30 according to FIG. 20 or may simple be disposed for the improvement of the positive anchoring of the anchoring section 22 in the base body 16.

Figure 16:
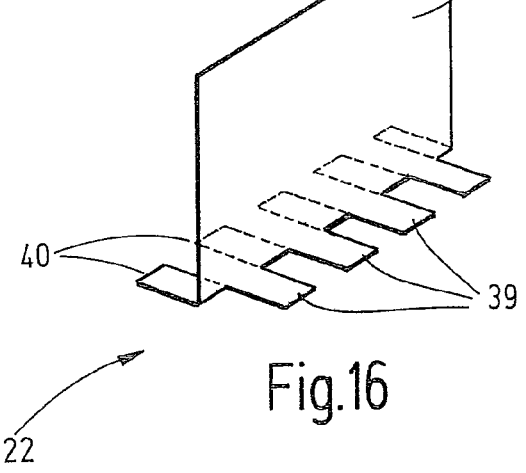
FIG. 16 a perspective isolated view of a further modified fastening element.

Referring to another embodiment of the anchoring element 12 shown by FIG. 16, the anchoring section 22 is formed by two rows of teeth or tabs 39, 40 extending in a comb-like manner in different directions from the lower edge of the connecting sections 23. Preferably, the tabs 39, 40 are arranged on a common plane. They may extend behind the reinforcement 17 in that the connecting section 23 is pushed through a corresponding slit in said section. However, it is also possible to hook the tabs 39 together with a reinforcement without slits configured as a woven fabric or a layer structure in that the tabs 39, 40 are threaded in the interstices of the grid-like woven fabric or layer structure. The fastening element 12 according to FIG. 16 is suitable particularly well for the transmission of pulling forces to the reinforcement 17.

Considering particularly large-area plates (for example, 4×6 meters), reinforcement ribs may be desirable on the rear side of the respective prefabricated concrete element 10. It is possible to adapt the textile reinforcement 17 to the corresponding form and also provide it with ribs. They may be waves formed in the reinforcement 17 or additional reinforcement elements attached to the reinforcement 17. It is advantageous to arrange the fastening elements 12 to 15 in the region of these ribs. For example, this rib may form the collar 16a according to FIG. 2. It is pointed out that FIG. 2 is not true to scale, i.e., the collar 16a or the rib may also be substantially larger than shown by FIG. 2.

Figure 17:
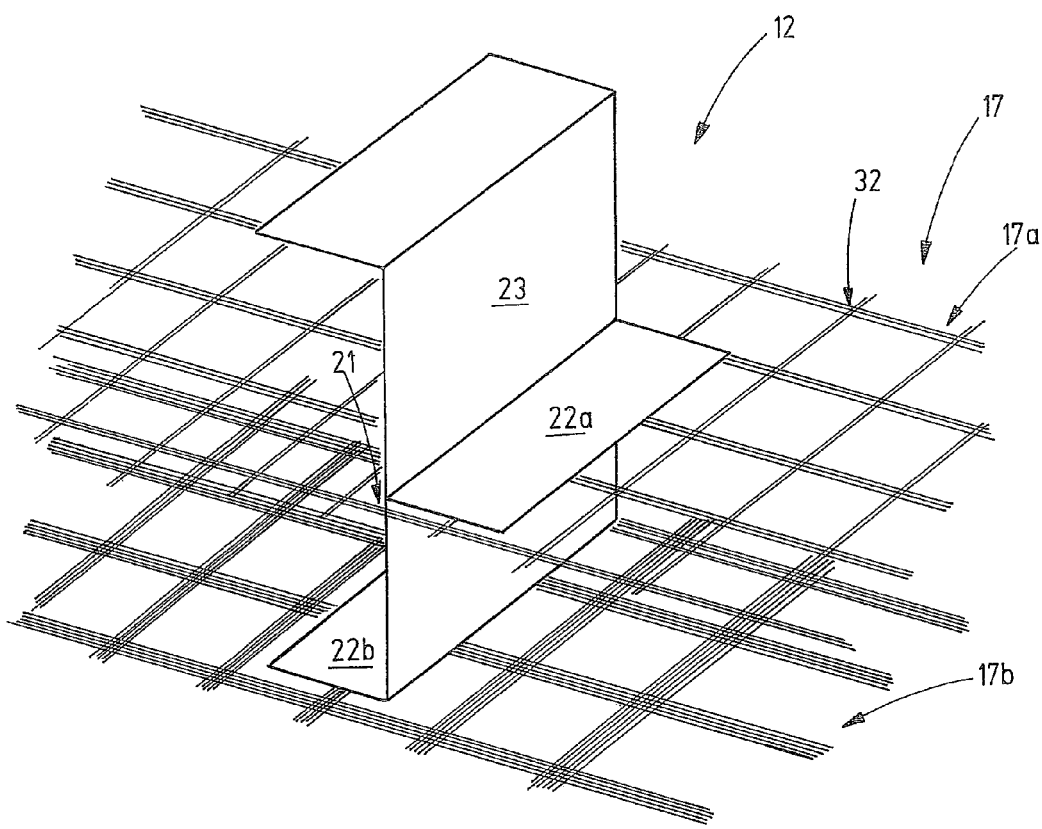
FIG. 17 a perspective view of a modified embodiment of a prefabricated concrete element with reference to its two-layer reinforcement and a two-level fastening element.

FIG. 17 illustrates another exemplary embodiment of the invention in which the at least one fastening element 12 has two levels. It comprises a first fastening section 22a and a second fastening section 22b that are arranged at a distance from each other. The first section 22a is connected to a first reinforcement layer 17a. The second fastening section 22b is connected to a second reinforcement layer 17 arranged at a distance from the latter. Additional reinforcement layers and fastening sections may be provided.

In the depicted exemplary embodiment, the fastening element 12 extends through the first reinforcement layer 17a. To do so, the reinforcement layer 17a may be provided with a slit 21. The connection between the fastening element 12 and the reinforcement 17 can be formed using any of the aforementioned techniques (gluing, welding, clamping, hooking, etc.). Furthermore, the fastening element may be modified in any of the aforementioned ways.

In general, it applies that the fastening element 12 can be configured as a single part or also as many parts of plastic material or metal as an injection-molded component or as a bent component, e.g., a punched and bent component.

The fastening element is disposed for fastening the prefabricated component, e.g., to a building. In addition, it may act during the casting process as a spacer of the second reinforcement layer 17b from the form and as a spacer between the reinforcement layers 17a, 17b. During the casting process the reinforcement layers 17a, 17b can be suspended in a floating manner by means of the fastening elements 12 (as well as any potentially additional fastening elements 13-15) in the casting form. This also applies to all the other embodiments of the invention.

Figure 18:
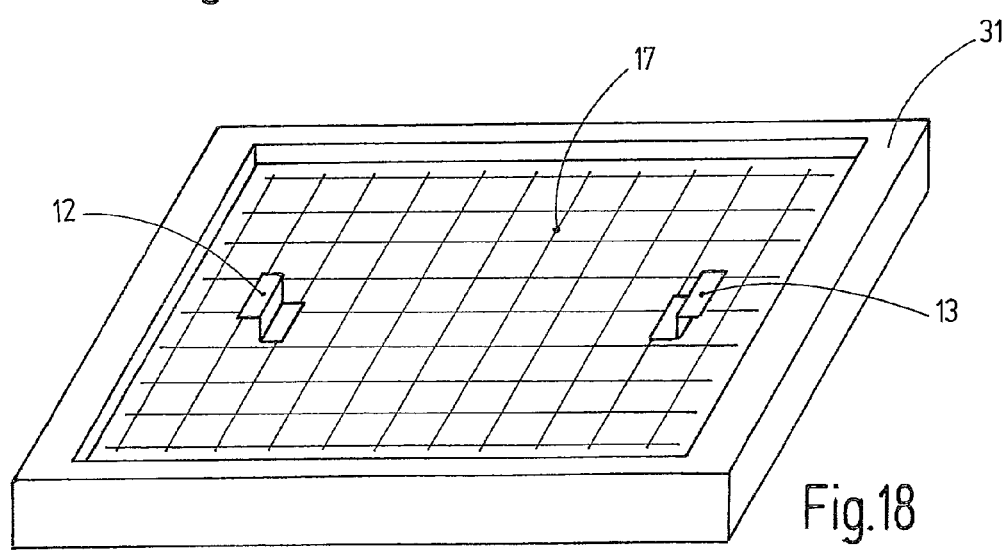
FIG. 18 a perspective view of a casting form with inserted reinforcement to illustrate the manufacture of the prefabricated concrete element.

In order to produce the prefabricated concrete element 10, the reinforcement 17 is first provided with fastening elements 12, 13, in which case the fastening elements 12, 13 are connected directly to the reinforcement 17 in a suitable manner. As is shown by FIG. 18, the thusly formed unit is then placed in a casting form 31 that is then filled with the not yet fully cured concrete. The concrete begins to cure. As soon as it has reached sufficient hardness, that is potentially still below its final hardness, the resultant concrete element 10 may be removed from the form. To accomplish this, the form may consist of several parts. With some care, the fastening elements 12, 13 may already be used for handling the prefabricated concrete element 10.

A prefabricated concrete element 10 having a textile reinforcement 17 comprises fastening elements 12, 13, 14, 15 that are directly connected to the reinforcement 17. The fastening elements 12 to 15 may be angled and extend through a flat side of the prefabricated concrete element 10. Likewise, they may be straight or elongated and emerge on narrow sides of a plate-shaped prefabricated concrete element 10. Due to the direct connection between the fastening element 12 to 15 and the reinforcement 17, the prefabricated concrete element can be made in a particularly extensive and thin form and thus be used as a facade panel.

LIST OF REFERENCE SIGNS

10 Prefabricated concrete element
11 Flat side
11a Transport lug
12-15 Fastening elements
16 Base body
17 Reinforcement, reinforcement layers 17a, 17b
18-20 Strands
21 Slit
22 Anchoring section/head/foot
23 Connecting section
14 Connection
25 Pocket
26 Adhesive
27 Fastening bracket
28 Groove
29 Section
30 Bar
31 Form
32 Intersecting point
33 Rod element
34 Threaded bore
35, 35' Cutout
36, 37 Slits
38-40 Tabs

The invention claimed is:

1. A prefabricated concrete element (10) comprising:
a base body (16) of a concrete,
at least one layer of a textile reinforcement (17) embedded in the base body (16), and
at least one fastening element (12-15) that is directly connected to the textile reinforcement (17) and accessible from outside of the base body (16) to provide a fastening point for the concrete element (10), wherein the at least one fastening element is of a metal material, wherein the direct connection between the fastening element (12-15) and the textile reinforcement (17) is a material-bonded connection formed by one of:
an adhesive; or
a plastic coating of the textile reinforcement.

2. The prefabricated concrete element of claim 1, wherein the textile reinforcement (17) comprises at least one of natural fibers, mineral fibers, or metal fibers.

3. The prefabricated concrete element of claim 1, wherein the fastening element (12-15) comprises a planar anchoring section (22) connected to the textile reinforcement (17) and a connecting section (23) extending away from said anchoring section out of the base body (16).

4. The prefabricated concrete element of claim 3, wherein the anchoring section (22) is configured as a flat plate.

5. The prefabricated concrete element of claim 3, wherein the anchoring section (22) is arranged so as to reach in a planar manner behind the textile reinforcement (17).

6. The prefabricated concrete element of claim 3, wherein the anchoring section (22) is inserted in a pocket (25) of the textile reinforcement (17).

7. The prefabricated concrete element of claim 1, wherein the textile reinforcement (17) comprises two reinforcement layers.

8. The prefabricated concrete element of claim 1, wherein the textile reinforcement (17) comprises a mesh, and the fastening element (12-15) has a head as an anchoring section (22), said head being arranged in the mesh.

9. The prefabricated concrete element of claim 8, wherein the head has a groove (28) on an outside circumference thereof for the accommodation of parts of the textile reinforcement (17).

10. The prefabricated concrete element of claim 1, wherein the textile reinforcement comprises synthetic fibers.

11. The prefabricated concrete element of claim 1, wherein the textile reinforcement comprises at least one of glass fibers or carbon fibers.

12. The prefabricated concrete element of claim 1, wherein the base body includes front and rear faces and a narrow side edge extending therebetween, and the fastening element includes a portion that is disposed on the narrow side edge of the base body.

13. The prefabricated concrete element of claim 1, wherein the at least one layer of textile reinforcement includes a plurality of textile strands arranged to form a generally planar mesh.

14. A method for manufacturing a prefabricated concrete element, comprising:
receiving by a shell form (31) a unit formed of a textile reinforcement layer (17) having fastening elements of a mental material affixed to the textile reinforcement,
receiving uncured concrete into the shell form (31),
curing the concrete, and
removing from the shell form a prefabricated concrete element comprising a base body of the concrete having front and rear faces and a narrow side edge extending therebetween, the textile reinforcement layer embedded in the base body, and the fastening elements directly connected to the textile reinforcement and including a portion accessible from outside of the base body at one of the front and rear faces to provide a fastening point for the concrete element,
wherein the direct connection between the fastening elements and the textile reinforcement is a material-bonded connection formed by one of:
an adhesive; or
a plastic coating of the textile reinforcement.

15. The method for manufacturing a prefabricated concrete element of claim 14, wherein the textile reinforcement layer includes a plurality of textile strands arranged to form a a generally planar mesh.

16. A prefabricated concrete element (10) comprising:
a base body (16) of a concrete having front and rear faces and a narrow side edge extending therebetween,
at least one layer of a textile reinforcement (17) embedded in the base body (16), and
at least one fastening element (12-15) of a metal material that is directly connected to the textile reinforcement (17) and includes a portion accessible from outside of the base body (16) at one of the front and rear faces to provide a fastening point for the concrete element 10,
wherein the direct connection between the fastening element (12-15) and the textile reinforcement (17) is a material-bonded connection formed by one of:
an adhesive; or
a plastic coating of the textile reinforcement.

17. The prefabricated concrete element of claim 16, wherein the textile reinforcement has a generally planar configuration, and the at least one fastening element extends perpendicularly to the textile reinforcement.

18. The prefabricated concrete element of claim 16, wherein the at least one layer of textile reinforcement includes a plurality of textile strands arranged to form a generally planar mesh.

* * * * *